UNITED STATES PATENT OFFICE.

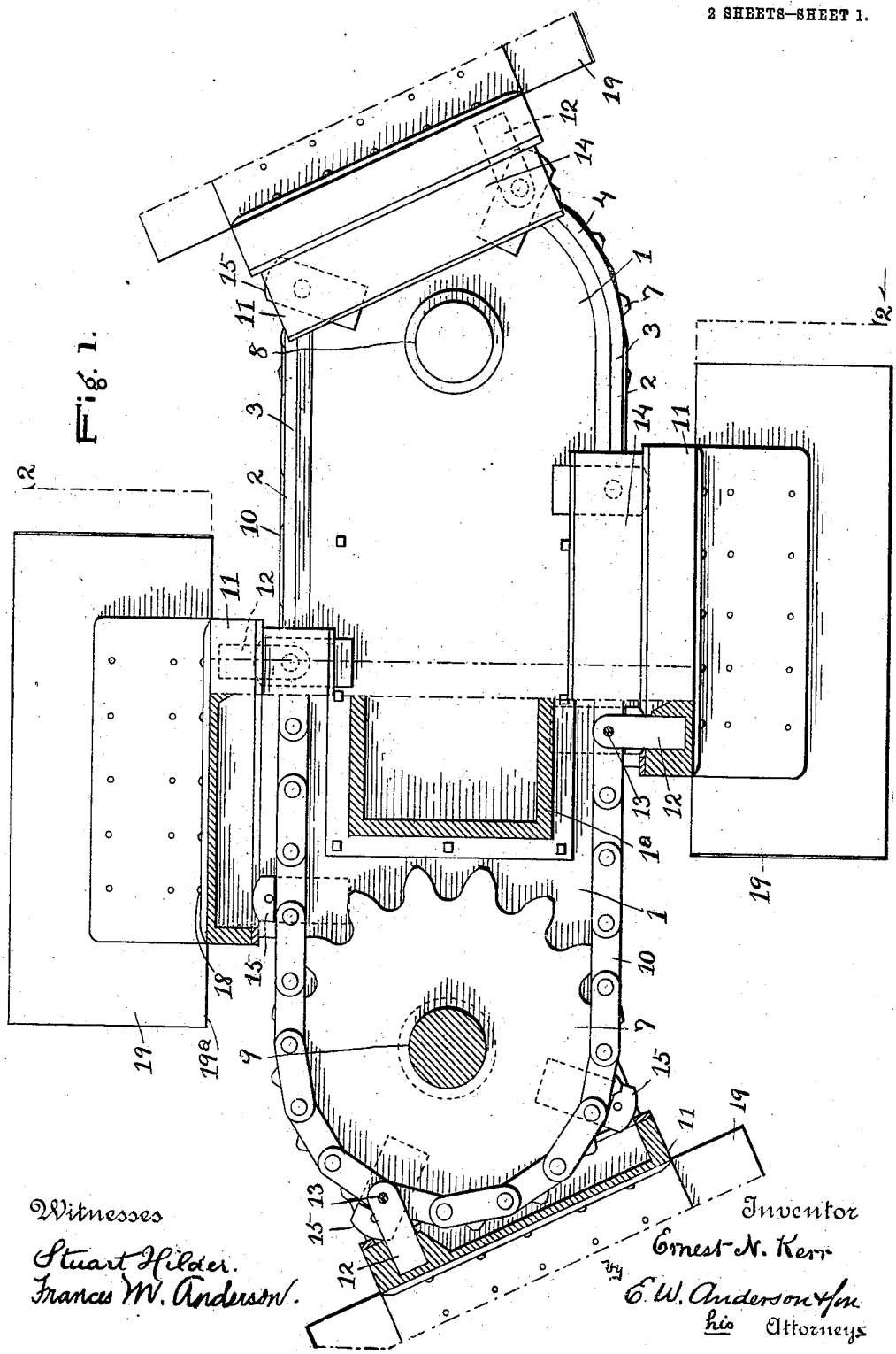

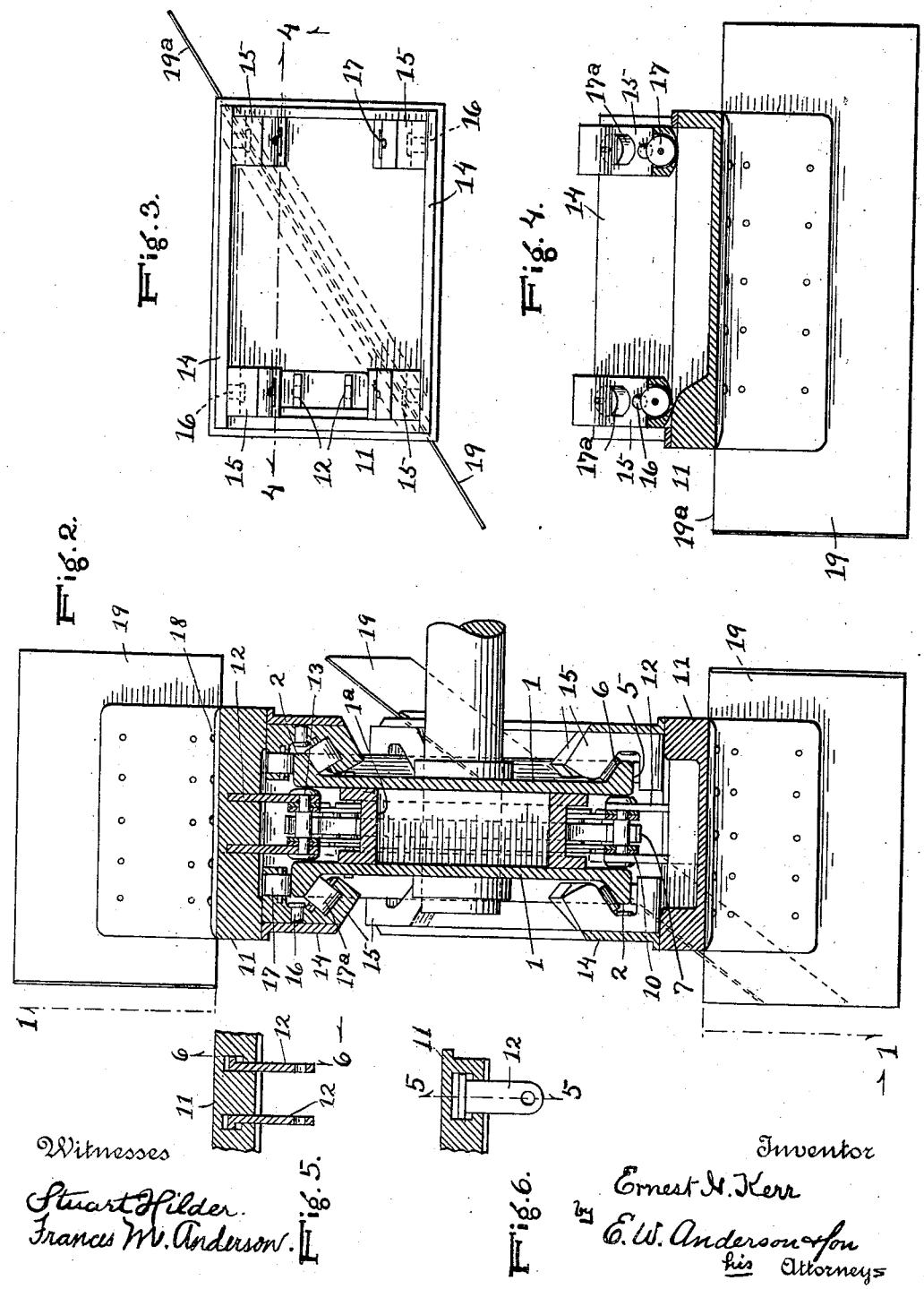

ERNEST N. KERR, OF ROCK ISLAND, ILLINOIS.

CHAIN PROPELLER.

988,112.

Specification of Letters Patent. Patented Mar. 28, 1911.

Application filed July 9, 1910. Serial No. 571,239.

*To all whom it may concern:*

Be it known that I, ERNEST N. KERR, a citizen of the United States, resident of Rock Island, in the county of Rock Island and State of Illinois, have made a certain new and useful Invention in Chain Propellers; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a longitudinal section of the invention on the line 1—1, Fig. 2. Fig. 2 is a cross section of the invention on the line 2—2, Fig. 1. Fig. 3 is a detail bottom plan view of one of the carriages. Fig. 4 is a detail sectional view taken on the line 4—4, Fig. 3. Figs. 5 and 6 are detail sectional views showing a modification of the connecting means between a carriage and the driving chain.

The invention has relation to improvements in chain propellers designed for either aerial or marine use, having for its object to increase the speed and efficiency of the propeller with a given power and speed of the engine.

The invention consists in the novel construction and combinations of parts as hereinafter set forth.

In the accompanying drawings, illustrating the invention, the numerals 1, 1, designate vertical oppositely disposed parallel plates, provided each with an outturned marginal portion having an endless track 2, composed of upper and lower parallel portions 3, 3, and semi-circular connecting end portions 4, 4, each track having a substantially right-angle outer surface 5, and an inclined inner surface 6. These plates are connected together and held in proper separated position by a cross-plate 1ª, and all of the plates may be web-form consistent with lightness and strength.

7, 7, are sprocket wheels having suitable supporting journal bearings at 8, and journal bearings in said plates 1, 1, at 9, 9, an endless sprocket chain 10, being carried by said wheels and being provided with two or more carriages 11, preferably four as shown, oppositely arranged with relation to said chain at equal distances apart, each carriage having at opposite end portions thereof centrally disposed inward extending links 12, 12, embracing the chain and having a bolt connection 13, therewith, said links having in some cases a slidable connection with the carriage in order that the chain may have free play and will not bind in its movement. Each carriage has laterally disposed inward extending opposite plates 14, with which trucks 15, 15, at each end portion of the carriage have a pivotal bolt connection 16, each truck bearing wheels 17, 17ª, one of which, 17, runs upon the outer surface of the track, its shaft being substantially at right angles to the truck, and the other of which, 17ª, runs upon the inner inclined surface of the track, its shaft and the wheel itself being inclined to correspond.

The carriage has, bolted to its outer surface at 18, one or more vertical propeller blades 19, one being shown, this blade being of straight planular character, extending diagonally of the carriage and inclined with relation thereto and to the driving chain, said blade extending at its end portions 19ª, 19ª, beyond the carriage.

In the operation of the invention the engine power will turn the sprocket wheels and chain, causing the carriages and propeller blades to move around upon the tracks, the trucks assuming a radial position with relation to the sprocket shafts and an angular position with relation to the carriage in passing around the curved portions of the track.

The double-surface tracks and double sets of wheels working thereupon provide for a strong construction, as required.

Having thus described my invention, what I claim as new and desire to secure by Letters Patent is:

1. A chain propeller having in combination opposite tracks having each upper and lower oppositely disposed endless bearing surfaces, a carriage having pivoted trucks provided with upper and lower wheels running upon said bearing surfaces, and a propeller blade, and sprocket gearing having operative connection with said carriage.

2. A chain propeller having in combination opposite tracks having each upper and lower oppositely disposed endless bearing surfaces, a carriage having opposite pivoted trucks provided each with upper and lower wheels running upon said bearing surfaces, and a propeller blade, and sprocket gearing having operative connection with said carriage between said trucks.

3. A chain propeller having a frame composed of side portions spaced apart and provided each with opposite outturned marginal portions having each upper and lower oppositely disposed endless bearing surfaces, a carriage having opposite pivoted trucks provided each with upper and lower wheels running upon said bearing surfaces, and a propeller blade, sprocket wheels and a sprocket chain located between said side portions of the frame, and means of connection between said carriage and said chain located between said opposite trucks.

4. A chain propeller having in combination a frame composed of side portions provided each with opposite outturned marginal portions having each upper and lower oppositely disposed endless bearing surfaces, a carriage having opposite pivoted trucks provided each with upper and lower wheels running upon said bearing surfaces, and a propeller blade, and sprocket gearing having operative connection with said carriage between said trucks.

5. A chain propeller having in combination opposite tracks having each inner and outer endless bearing surfaces, one of which is inclined, a carriage having opposite pivoted trucks provided with inner and outer wheels, one of which is inclined, running upon said bearing surfaces, and a propeller blade, and sprocket gearing having operative connection with said carriage between said trucks.

6. A chain propeller having in combination opposite tracks having each inner and outer endless bearing surfaces, a carriage having at each end portion thereof opposite pivoted trucks provided with inner and outer wheels running upon said bearing surfaces, and a propeller blade, sprocket wheels, a chain carried thereby, and connecting links having at one end thereof a pivotal connection with said chain and at the opposite ends thereof a slidable connection with said carriage.

7. A chain propeller having in combination opposite plates having a cross-plate connecting the same, said plates being provided with opposite tracks having each inner and outer bearing surfaces, one of which is inclined, a carriage having at each end thereof opposite pivoted trucks provided with inner and outer wheels, one of which is inclined, running upon said bearing surfaces, and a propeller blade, sprocket wheels, a chain carried thereby, and connecting links having at one end thereof a pivotal connection with said chain and at the opposite ends thereof a slidable connection with said carriage.

In testimony whereof I affix my signature. in presence of two witnesses.

ERNEST N. KERR.

Witnesses:
S. A. TEMPLE,
J. H. CLELAND.

---

Copies of this patent may be obtained for five cents each, by addressing the "Commissioner of Patents, Washington, D. C."